UNITED STATES PATENT OFFICE.

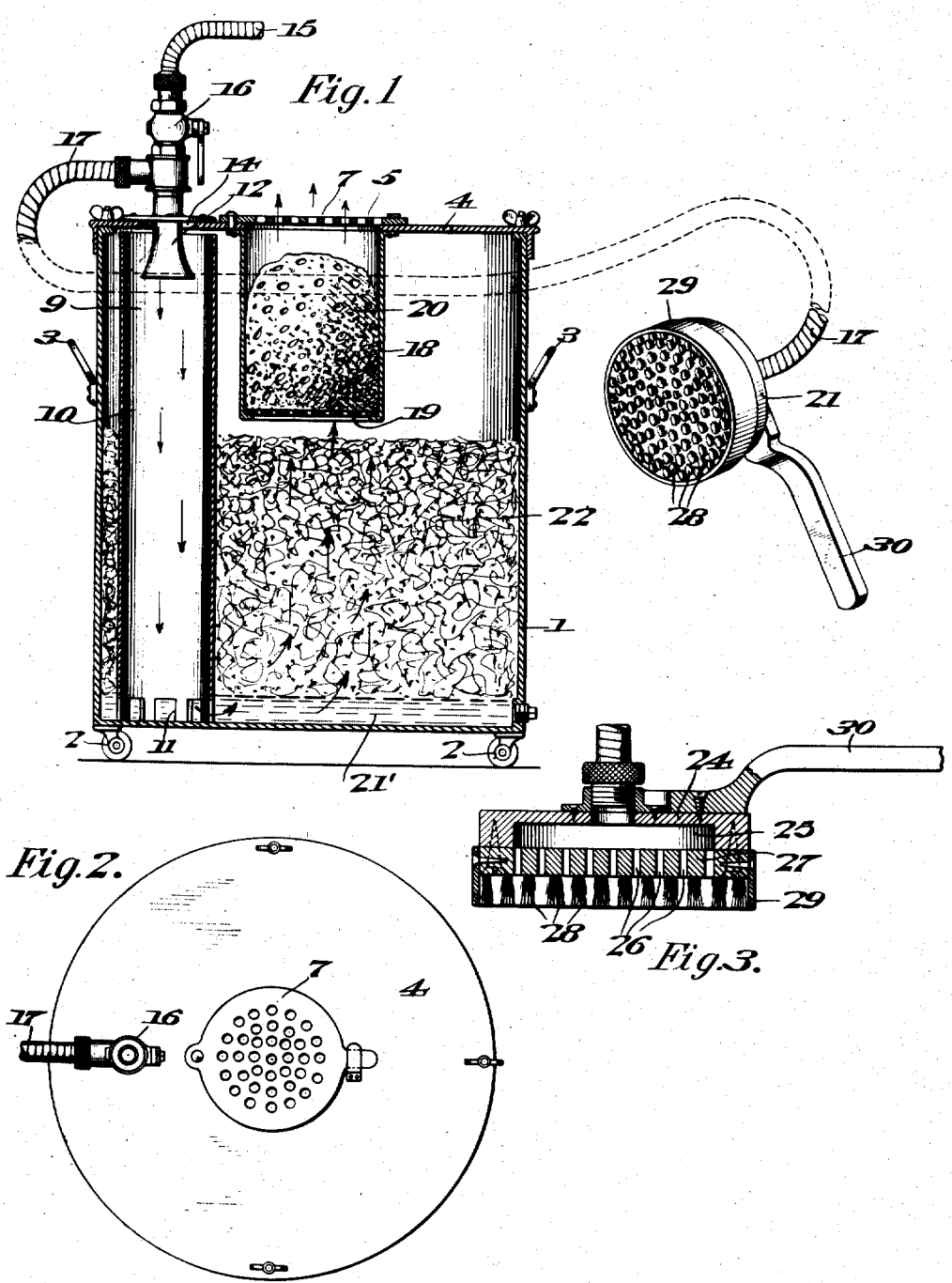

JOHN MacNAULL WILSON, OF MONTCLAIR, NEW JERSEY, ASSIGNOR TO FRANKLIN MURPHY, OF NEWARK, NEW JERSEY.

CLEANING APPARATUS.

1,243,472.  Specification of Letters Patent.  Patented Oct. 16, 1917.

Application filed February 14, 1914. Serial No. 818,645.

*To all whom it may concern:*

Be it known that I, JOHN MACNAULL WILSON, a citizen of the United States, residing at Montclair, in the county of Essex and State of New Jersey, have invented certain new and useful Improvements in Cleaning Apparatus; of which the following is a specification.

This invention relates to mechanism for removing dirt, dust, germs and other foreign substances from various articles, such as car seats and upholstery, and then collecting such foreign substances in a suitable receptacle by a method which causes the foreign substances to be entirely removed from the air before it escapes from the receptacle.

The invention further consists in passing the air through suitable materials adapted to collect the foreign particles or substances carried thereby and also in utilizing the air to maintain such material in a suitable condition to cause the foreign particles to adhere thereto.

A further object of the invention is to provide an apparatus that may be actuated from any suitable pressure system, such as the train or yard pressure, and which is compact in its construction, so that it can be readily moved from place to place and which is economical in operation.

Various other objects of the invention will be obvious from an inspection of the drawings and certain other objects will be hereinafter set forth in describing one form of mechanism embodying my invention that is shown in the accompanying drawings, in which Figure 1 is a vertical sectional view through a portable receptacle operatively connected with a vacuum brush shown in perspective and together disclosing a preferred embodiment of my invention.

Fig. 2 is a plan view looking down upon the top of the receptacle shown in Fig. 1, and Fig. 3 is a sectional view taken axially through the vacuum brush shown in Fig. 1.

Referring particularly to the apparatus shown in the drawings, the open top receptacle 1 is preferably mounted on rollers 2 and has handles 3 for moving the same from place to place. The receptacle is closed by any suitable means, as a cover 4 having an opening 5 therethrough, protected by a screen 7 which may be pivoted to the top of the cover and held in closed position by any suitable means. The receptacle contains one or more independent compartments which are formed by suitable partitions.

One compartment 9 is formed by a wall or partition 10, preferably circular in section, which extends approximately the full depth of the receptacle. Said wall is provided at or near its bottom with a plurality of openings or passages 11 communicating with the interior of the receptacle. The top of said compartment receives the outlet or nozzle 12 of a suitable form of vapor ejector which projects into said compartment through an opening 14 provided in the cover. The ejector is operatively connected to any suitable source of fluid pressure (not shown) through a pipe 15 in which the pressure is controlled by any suitable means as the valve 16. The ejector is connected by means of a conduit 17 with a vacuum suction brush 21.

Preferably a separate compartment 18 is secured to the underside of the cover immediately below the screen 7 that is provided with a perforated or open-work bottom 19. Preferably the compartment is also circular in section, and is adapted to contain any suitable air filtering means, such as a sponge 20 capable of absorbing moisture which may be applied through the screen.

A quantity of suitable liquid 21', such as water of a depth sufficient to cover the openings 11, is contained in the bottom of the receptacle and the space below the compartment 18 is wholly or partially filled with excelsior or similar material 22, the bottom portion of which is submerged in the liquid. The excelsior extends around the compartment 10 so that it is necessary for the air to pass through it, in order to escape from said compartment.

The brush comprises a hollow head 24 provided with a suction chamber 25 in communication with a plurality of openings 26 provided in the head 27. Said head is provided intermediate the openings with tufts of wire, bristle or other suitable abrading material 28. An apron 29 of leather or other flexible material is also secured to the head, which extends outward therefrom a distance approximately equal to the length of the brushes, thus inclosing the brushes and forming a flexible, approximately air-tight bearing around the brush. A suitable handle 30 provides means for manipulating the brush.

In operation, the dust filtering material contained in the main body of the receptacle forms a porous mass which permits the passage of the air therethrough. This porous mass is kept in a moistened condition by the water or other liquid, such as a suitable disinfectant, provided in the bottom of the receptacle, which normally forms a liquid seal for the openings provided in the lower part of the air receiving compartment or chamber. The air is directed through the liquid in a series of currents formed by the walls between the openings so that a series of eddy currents are produced in the liquid, which promote the spraying of the liquid. Consequently, the porous filtering material is automatically moistened and maintained in a moistened condition by the air currents. In addition to the filtering effect of the material in the lower part of the receptacle, the air is caused, by the form of the second compartment, to pass through a considerable thickness of sponge or other material, which further cleanses and purifies the same. The apparatus is adapted for use in connection with the train or yard pressure which creates a suction in the brush as it is drawn over the cushions and over the upholstery. The flexible apron around the brush limits the suction area, causing the air to be drawn through the fabric while it is being abraded by the bristles, thus effectively releasing all particles of foreign matter that may have been deposited thereon.

By means of my improvements, a railroad car or similar conveyance can be thoroughly cleaned without removing the cushions or upholstery therefrom by a sanitary method which filters not only the dirt and dust, but also other foreign matter or substances, as disease germs. All the parts of the apparatus are readily accessible, particularly for the purpose of renewing the filtering material if it should become saturated by dirt. If necessary, a fresh supply of liquid may be added without stopping the operation of the apparatus. The brush is particularly adapted for use in connection with curved surfaces to which it readily conforms, because of the flexible nature of the apron and abrading brushes.

It is understood that while I have shown and described and have pointed out in the annexed claims certain novel features of construction, arrangement and operation of one form of mechanism embodying my invention, it will be obvious to those skilled in the art that various omissions, substitutions and changes in the form and details of the apparatus and its operation may be made without departing from the spirit of the invention.

I claim as my invention:—

1. In an apparatus of the class described, a receptacle, an open ended cylindrical tube resting on the bottom of the receptacle and comprising an inclosed inlet passage for the air and foreign matter carried thereby and provided with outlets communicating with the interior of the receptacle at the bottom thereof, and a mass of dust collecting material in said receptacle surrounding the tube above the outlets, and means below the material and in close proximity thereto for automatically moistening said material.

2. In an apparatus of the class described, a receptacle comprising a plurality of compartments, one of said compartments being loose within the receptacle and having communicating openings with the interior of the receptacle, an air filtering material in the other compartment, dust collecting material between said compartments, and a water seal for said openings into the receptacle from the first mentioned compartment, the major portion of said material being above the level of said water and with a relatively small portion of said material submerged in said water.

3. In an apparatus of the class described, the combination with a receptacle having a cover provided with an air outlet and having a separate open ended cylindrical compartment therein resting on the bottom of said receptacle, a suction device carried by said cover and connected with said compartment, said suction device and air outlet removable with the receptacle cover, a plurality of air passages from said compartment communicating with the interior of the receptacle adjacent the bottom thereof, a liquid seal for said passages, and dust filtering material in said receptacle between said seal and the air outlet.

4. In an apparatus of the class described, the combination with an open top receptacle, a plurality of compartments in said receptacle, one of said compartments being loose within the receptacle and provided near one end with a passage communicating with the interior of the receptacle and having a suction apparatus extending into its opposite end to retain the same in position, a liquid seal for said passage, filtering material surrounding the first mentioned compartment and filtering material in the second compartment and closing covers for each of said compartments.

5. In a device for removing dust from air which comprises a receptacle provided with a wide open top, an open end cylinder extending substantially from top to bottom of said receptacle adapted to be positioned in said receptacle, the lower end of said cylinder being provided with an outlet into the receptacle, a cover for said receptacle, an air inlet nozzle fixed to said cover and adapted to extend into said cylinder, said cover having an opening therethrough constituting an air outlet from the receptacle, a compartment secured to the underside of said cover below the opening therethrough, said compartment being perforated to place the same in fluid communication with the receptacle.

This specification signed and witnessed this 9th day of February, A. D. 1914.

J. MacNAULL WILSON.

Signed in the presence of—
 Chas. C. Gunterberg,
 R. W. Perlee.